(No Model.)
E. B. CUTTEN.
CARBON FOR VOLTAIC CELLS.
No. 508,091. Patented Nov. 7, 1893.
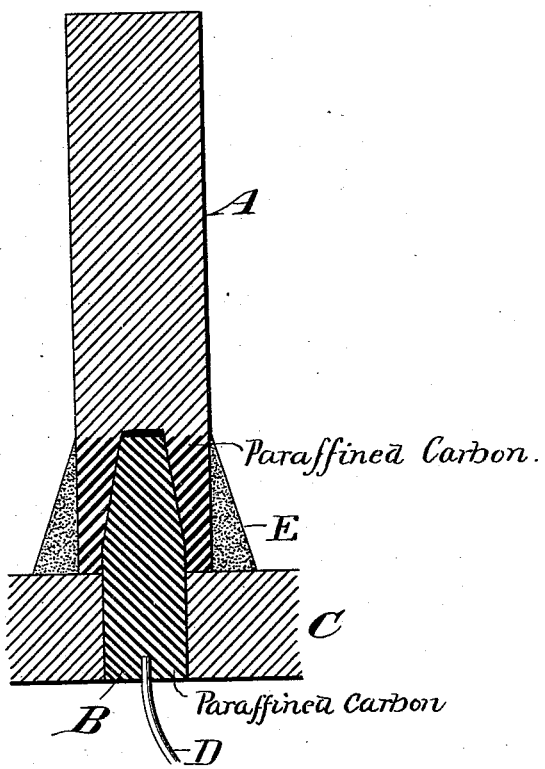
Witnesses:-
D. H. Haynord
T. R. Mollen
Inventor:-
Elisha B. Cutten
by Park Benjamin
his attorney
THE NATIONAL LITHOGRAPHING COMPANY,
WASHINGTON, D. C.

UNITED STATES PATENT OFFICE.

ELISHA BARTON CUTTEN, OF NEW YORK, N. Y.

CARBON FOR VOLTAIC CELLS.

SPECIFICATION forming part of Letters Patent No. 508,091, dated November 7, 1893.

Application filed March 28, 1893. Serial No. 467,926. (No model.)

*To all whom it may concern:*

Be it known that I, ELISHA BARTON CUTTEN, of the city, county, and State of New York, have invented a new and useful Improvement in Carbons for Voltaic Cells, of which the following is a specification.

The use of carbon as an electrode in voltaic cells, whether primary or secondary, or in cells especially adapted for electrolytic purposes, has long been known. In all instances where large pieces of carbon are employed, and especially in electrolytic cells for the production of chemical substances by the decomposition of solutions, much difficulty has been found in holding such carbons in place. Either the electrolyte or masses of salt deposited therefrom have always intruded themselves in the joint between the carbon electrode and its holder, with the result of producing high electrical resistance at such joint; and not only this, but where multiple electrodes are employed, a difference in resistance between the several joints, which resistance constantly varies during the practical employment of the cell.

My present invention relates to a mode of supporting the carbon electrode, which, I find, by actual experiment in large electrolytic cells, fully meets the difficulty above mentioned.

My invention consists in the combination with the mass of carbon forming the electrode of a second body of carbon jointed thereto, which second body of carbon is completely impregnated with paraffine. The body of the electrode at and around the joint is also impregnated with the same material; and these two bodies are then forced into close and binding contact.

The accompanying drawing is a vertical section of a carbon electrode and the additional piece of carbon jointed thereto.

A is the carbon electrode, which may be in the form of a plate, rod, or bar. For the purposes of electrolytic cells, this carbon is preferably the variety known as "gas carbon." In one end or edge of this plate or bar A is formed a tapered opening into which is driven and tightly fits the tapered carbon rod B. The portion of the electrode A around the aperture which receives the rod B for some distance beyond the same, is impregnated with paraffine, in any suitable way. The rod B is also impregnated with paraffine in any way, though preferably by the method which I have described and claimed in another application for Letters Patent filed simultaneously herewith, serially numbered 467,926. When the rod B is driven into the electrode A, a very tight joint is made, which is thoroughly packed by the paraffine; so that in practice it is impossible for the liquid electrolyte to introduce itself in the joint or for salts to form in or about the same. The rod B protrudes beyond the electrode A, and may be inserted in any suitable wall or partition, as C, in order to support the electrode A in vertical position. The conducting wire, D, of the cell leads to the rod B and may be secured thereto by any suitable means.

While I have, in the preceding specification, termed the part A "the electrode," and here shown that part as containing the aperture which receives the rod B, it is to be understood that my invention also includes a body, such as B, having an aperture into which the electrode A fits; one arrangement being merely the mechanical equivalent of the other.

In order to prevent any possible attack of the carbon electrode by the electrolyte, it is advantageous to surround the same at the joint with an envelope, E, of paraffine, paraffine and gutta percha, or other insulating material.

I claim—

The combination of a carbon electrode for a voltaic cell, and a carbon holder or terminal therefor, one of said parts being impregnated with paraffine and inserted in a recess formed in the other part, and an external envelope of insulating material, such as paraffine, surrounding the said parts at the joint, substantially as described.

ELISHA BARTON CUTTEN.

Witnesses:
H. R. MOLLER,
M. BOSCH.